United States Patent
Evanitsky

(10) Patent No.: US 10,360,535 B2
(45) Date of Patent: Jul. 23, 2019

(54) ENTERPRISE CLASSIFIED DOCUMENT SERVICE

(75) Inventor: Eugene S. Evanitsky, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 2347 days.

(21) Appl. No.: 12/976,028

(22) Filed: Dec. 22, 2010

(65) Prior Publication Data

US 2012/0166353 A1 Jun. 28, 2012

(51) Int. Cl.
| | | |
|---|---|---|
| *G06K 9/20* | (2006.01) | |
| *G03G 21/04* | (2006.01) | |
| *G06F 15/00* | (2006.01) | |
| *G06F 17/00* | (2019.01) | |
| *G06Q 10/10* | (2012.01) | |

(52) U.S. Cl.
CPC .............. *G06Q 10/10* (2013.01); *G06F 15/00* (2013.01); *G06F 17/00* (2013.01)

(58) Field of Classification Search
USPC .................. 705/1.1, 342; 726/3; 713/176, 2; 707/737, 999; 709/223; 358/1.15, 3.28, 358/1.9; 382/100, 135; 194/212
See application file for complete search history.

(56) References Cited

U.S. PATENT DOCUMENTS

| | | | | | |
|---|---|---|---|---|---|
| 4,738,901 A | * | 4/1988 | Finkel | ................... | G03G 21/046 428/690 |
| 4,748,480 A | * | 5/1988 | Jacobs | ................. | G03G 21/046 355/133 |
| 6,188,787 B1 | * | 2/2001 | Ohmae | ................ | G03G 21/046 382/135 |
| 6,731,784 B2 | * | 5/2004 | Yang | ..................... | G06K 9/2054 382/135 |
| 7,085,399 B2 | * | 8/2006 | Suzaki | .................... | G06T 1/005 382/100 |
| 7,245,740 B2 | | 7/2007 | Suzaki | | |
| 2003/0009672 A1 | * | 1/2003 | Goodman | ............. | G06F 17/211 713/176 |
| 2004/0123145 A1 | * | 6/2004 | Baffes | ................. | H04L 63/1416 709/223 |
| 2006/0288015 A1 | * | 12/2006 | Schirripa | ............ | G06F 16/9577 707/999.1 |
| 2008/0177994 A1 | * | 7/2008 | Mayer | ................... | G06F 9/4418 713/2 |
| 2010/0046015 A1 | * | 2/2010 | Whittle | ................ | G06F 3/1222 358/1.9 |
| 2011/0137898 A1 | * | 6/2011 | Gordo | .................... | G06F 16/35 707/737 |
| 2011/0192894 A1 | | 8/2011 | Ragnet et al. | | |
| 2011/0197260 A1 | * | 8/2011 | Maes | ................ | 726/3 |
| 2011/0273739 A1 | * | 11/2011 | Grasso | ................... | G06Q 30/02 358/1.15 |
| 2012/0072969 A1 | * | 3/2012 | Aratsu et al. | ..................... | 726/1 |

* cited by examiner

*Primary Examiner* — Lynda Jasmin
*Assistant Examiner* — Kimberly L Evans
(74) *Attorney, Agent, or Firm* — Fay Sharpe LLP

(57) ABSTRACT

A method of maintaining a classified document labeling policy of an institution. One or more documents are received and document types are determined therefor. A determination is made as to whether the documents comply with the classified document labeling policy of the institution using one or more rules. The rules embody the classified document labeling policy of the institution in a computer interpretable form and are dependent upon document type. Corrective measures for ones of the documents determined to be non-compliant are taken.

19 Claims, 3 Drawing Sheets

ENTERPRISE CLASSIFIED DOCUMENT SERVICE

BACKGROUND

The present disclosure relates generally to document processing. It finds particular application in conjunction with identifying classified documents, and will be described with particular reference thereto. However, it is to be appreciated that the present exemplary embodiments are also amenable to other like applications.

Most large institutions have a defined process for labeling classified documents. Classified documents are typically documents that include confidential and/or business sensitive data, whereby they are intended to have controlled access and distribution. Further, classified documents normally have a defined retention policy. One problem with classified documents is that the process for labeling them is often unwieldy. As such, authors of documents often do not understand and/or are not familiar with the process of labeling classified documents, which often leads to a failure to label documents and/or incorrectly labeling documents.

The present disclosure provides a new and improved system and method which overcome the above-referenced problems and others.

BRIEF DESCRIPTION

According to aspects illustrated herein, a method is provided of maintaining a classified document labeling policy of an institution. One or more documents are received and document types are determined therefor. A determination is made as to whether the documents comply with the classified document labeling policy of the institution using one or more rules. The rules embody the classified document labeling policy of the institution in a computer interpretable form and are dependent upon document type. Corrective measures for ones of the documents determined to be non-compliant are taken.

According to further aspects illustrated herein, a classified document system is provided for maintaining a classified document labeling policy of an institution. The system includes a classification engine that determines document types for one or more documents. The system further includes a rules engine that determines whether the documents comply with the classified document labeling policy of the institution using one or more rules. The rules embody the classified document labeling policy of the institution in a computer interpretable form and are dependent upon document type. The system further includes a controller that receives the documents and takes corrective measures for ones of the documents determined to be non-compliant.

According to further aspects illustrated herein, a user device including a classified document module for maintaining a classified document labeling policy of an institution is provided. The user devices includes a memory and a processor. The memory includes computer executable instructions that monitor the user device in real time for authoring and/or sharing of documents, determine document types for one or more documents being authored and/or shared, determine whether the documents comply with the classified document labeling policy of the institution using one or more rules, and take corrective measures for ones of the documents determined to be non-compliant. The rules embody the classified document labeling policy of the institution in a computer interpretable form and are dependent upon document type. The processor executing the computer executable instructions.

DETAILED DESCRIPTION

Figure 1:
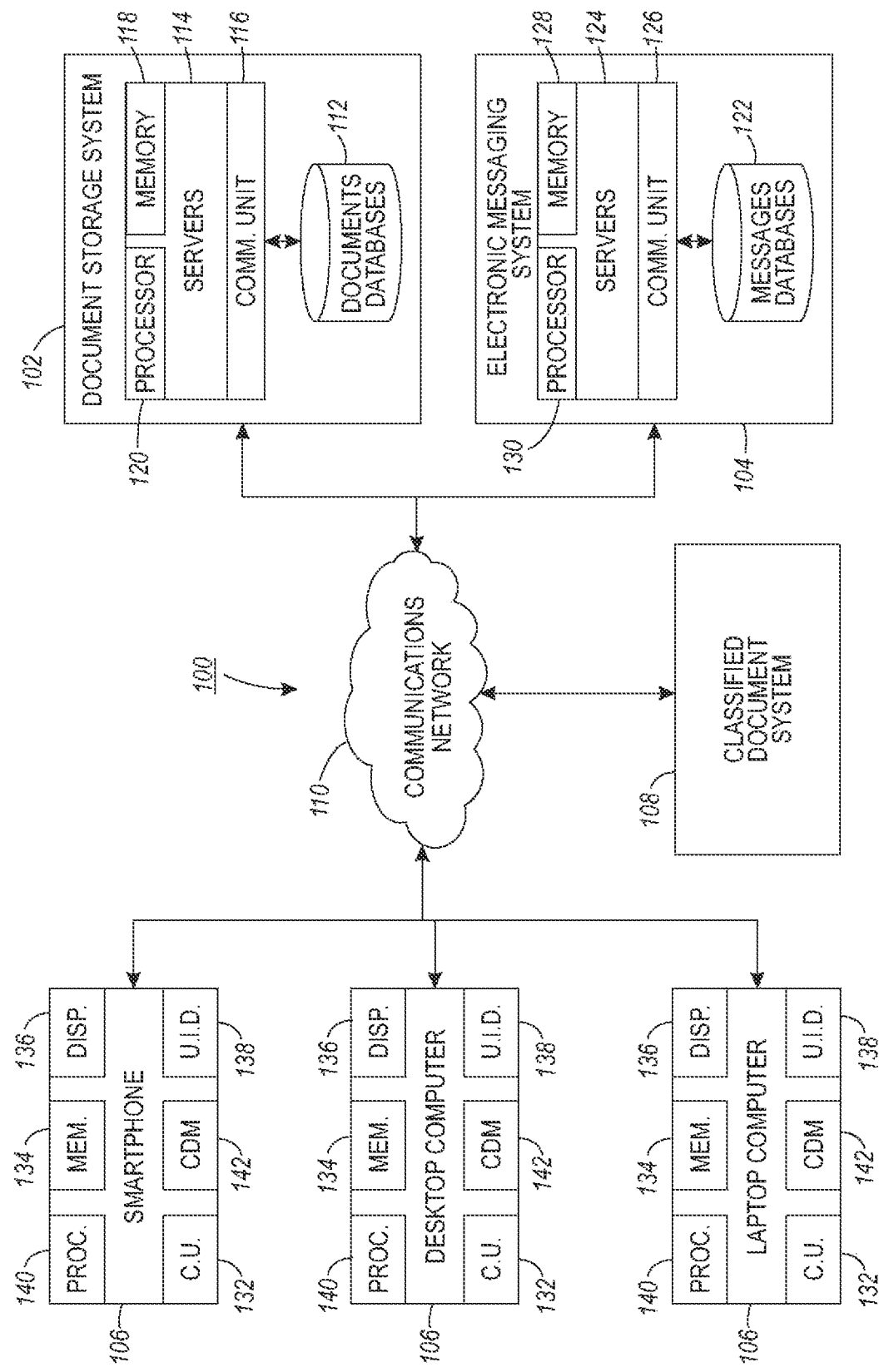
FIG. 1 is a block diagram of an information technology (IT) infrastructure for an institution.

With reference to FIG. 1, an information technology (IT) infrastructure 100 for an institution is provided. It is contemplated that the institution is one of a business institution, an academic institution, a government institution, and the like. The IT infrastructure 100 includes a document storage system (DSS) 102, an electronic messaging system (EMS) 104, one or more user devices 106, a classified document system (CDS) 108, and the like. In certain embodiments, it is contemplated that the DSS 102 and the CDS 108 are part of a common document system (not shown). Suitably, the components of the IT infrastructure 100 are interconnected via a communications network 110, such as the Internet, a local area network, a wide area network, a wireless network, or the like.

The DSS 102 is a repository of documents generated throughout the institution and includes one or more documents, such as emails, web pages, text documents, spreadsheet documents, images, and the like. The documents may be stored in one or more of an image format, an electronic format, or the like. In certain embodiments, each of the documents includes document properties, such as creation date, modification date, classified status, retention policy, and the like. The DSS 102 suitably allows remote access to the documents over the communications network 110.

In certain embodiments, the DSS 102 maintains a profile of searchable Meta data for each of the documents. It is contemplated that the profile for each of the documents includes one or more of a description of the document, a title of the document, a document type, one or more of the document properties, and the like. Document type is the granularity with which the classified document labeling policy refers to documents. Additionally or alternatively, in certain embodiments, the DSS 102 maintains an audit log. The audit log tracks actions performed on the DSS 102 by, for example, users and/or devices of the IT infrastructure 100. It is contemplated that these actions include one or more of modification of document content, deletion of a document, modification of document Meta data, modification of a document location, copying a document, and the like.

One or more databases 112 and/or one or more servers 114 typically embody the DSS 102. The databases 112 store the documents, and, in certain embodiments, the Meta data and/or the audit log. The databases 112 include relational databases, file systems, and the like. The servers 114 facilitate remote access to the documents via the communications network 110 and, when applicable, searching of the Meta data. In certain embodiments, the servers 114 include document management servers, file servers, file repository servers, and the like. The databases 112 and/or the servers 114 are typically centrally located within the IT infrastructure 100 of the institution. However, it is contemplated that the databases 112 and/or the servers 114 are distributed throughout the IT infrastructure 100 at varying locations therein.

Each of the servers 114 includes a communication unit 116, a memory 118, a processor 120, and the like. The communications units 116 provide the servers 114 with interfaces from which to interact with the databases 112 and/or each other 114, optionally via the communications network 110. The communications units 116 further allow the servers 114 to interact with other components of the IT infrastructure 100, such as the user devices 106, via the communications network 110. The memories 118 include computer executable instructions for performing the above noted functions associated with the servers 114, such as allowing remote access to the documents. The processors 120 execute the computer executable instructions on the memories 118 to perform the above noted functions.

The EMS 104 allows users and/or devices of the IT infrastructure 100, such as the user devices 106, to send and/or receive messages accompanied by documents to and/or from other users and/or devices of the IT infrastructure 100. In certain embodiments, the EMS 104 further allows users and/or devices of the IT infrastructure 100 to send and/or receives messages accompanied by documents to and/or from users and/or devices external to the IT infrastructure 100. For example, the EMS 104 allows a user of the IT infrastructure 100 to send an email with an attached document to a party external to the IT infrastructure 100 over the Internet. Additionally or alternatively, in certain embodiments, the EMS 104 maintains an audit log. The audit log tracks actions performed on the EMS 104, including documents sent via the EMS 104.

One or more databases 122 and/or one or more servers 124 typically embody the EMS 104. The databases 122 store the messages sent through and/or received via the EMS 104. Additionally or alternatively, the databases 122 store the audit log. The servers 124 facilitate the receipt and transmission of messages via the communications network 110. In certain embodiments, the servers 124 include email servers, instant message servers, and the like. As with the DSS 102, the databases 122 and/or the servers 124 are typically centrally located within the IT infrastructure 100 of the institution. However, it is contemplated that the servers 124 and/or the databases 122 are distributed throughout the IT infrastructure 100 at varying locations therein.

Each of the servers 124 includes a communication unit 126, a memory 128, a processor 130, and the like. The communications units 126 provide the servers 124 with interfaces from which to interact with the databases 122 and/or each other 124, optionally via the communications network 110. The communications units 126 further allow the servers 124 to interact with other components of the IT infrastructure 100, such as the user devices 106, via the communications network 110. The memories 128 include computer executable instructions for performing the above noted functions associated with the servers 124, such as allowing remote access to the documents. The processors 130 execute the computer executable instructions on the memories 128 to perform the above noted functions associated with the servers 124.

The user devices 106 allow associated users to read and/or write documents within the IT infrastructure 100, optionally via the communications network 110. It is contemplated that these documents are stored local to the user devices 106 and/or on the DSS 102. In certain embodiments, the user devices 106 further allow associated users to message documents within the IT infrastructure 100 via the EMS 104 and/or print documents within the IT infrastructure 100. To simply these tasks, the user devices 106 suitably include graphical user interfaces. For example, it is contemplated that a graphical user interface of one of the user devices 106 allows an associated user to read a document located on the DSS 102 and, optionally, print the document.

The user devices 106 are digital processing devices, such as computers, smart phones, personal digital assistants, and the like, executing software to carry out the above noted functions. That is to say, the user devices 106 are digital processing devices executing software to allow users associated with the user devices 106 to read and/or write documents and, in certain embodiments, message and/or print documents. For example, it is contemplated that a word processing program, such as MICROSOFT WORD, executing on the user devices 106 facilitates the reading and/or writing of documents. As another example, it is contemplated that an email program, such as MICROSOFT OUTLOOK, facilitates the messaging of documents.

Each of the user devices 106 suitably includes a communications unit 132, a memory 134, a display 136, a user input device 138, a processor 140, and the like. The communications units 132 allow the user devices 106 to interact with other components of the IT infrastructure 100, such as the DSS 102 or the CDS 108, via the communications network 110. The memories 134 include computer executable instructions for performing the abovenoted functions associated with the user devices 106, such as reading and/or writing documents. The displays 136 display the graphical user interfaces facilitating user interaction with the user devices 106. The user input devices 138 allow users to interact with the graphical user interfaces. The processors 140 execute the computer executable instructions on the memories 134.

In certain embodiments, each of one or more of the user devices 106 further includes a classified document module (CDM) 142. The ones of the user devices 106 including a CDM are hereafter referred to as the subscribed user devices. The CDMs 142 are suitably embodied by computer executable instructions to be executed by the processors 140, but it is contemplated that the CDMs 142 are hardware. An IT administrator suitably installs the CDMs 142 on the subscribed user devices, but it is contemplated that viral and/or trolling technology is used to install the CDMs 142 on the subscribed user devices. For example, it is contemplated that flaws in an operating system of a subscribed user device are exploited to install a CDM.

One or more of the CDMs 142 scan associated subscribed user device for documents. It is contemplated that this scanning is triggered periodically by, for example, a timer event, a network event (from, for example, the CDS 108), or the like. Further, it is contemplated that the documents the CDMs scan for include one or more of all documents, documents created and/or modified within a predetermined number of past days, documents that have not been evaluated before, and the like. Upon locating a document, a CDM evaluates the document to determine whether it complies with classified document rules of the institution. The classified documents rules embody the classified document labeling process in a computer interpretable form.

Additionally or alternatively, one or more of the CDMs 142 monitor associated subscribed user devices on an ongoing basis for the authoring and/or sharing of documents. It is contemplated that authoring includes creating and/or modifying documents. Further, it is contemplated that sharing includes printing documents and/or messaging documents via, for example, the EMS 104. Upon detecting the authoring and/or sharing of a document, a CDM evaluates the document to determine whether it complies with the classified document rules of the institution. For example, when a document is emailed or printed, the document is evaluated. In the case of sharing, the evaluation is suitably performed before the document is actually shared (e.g., emailed or printed).

Additionally or alternatively, one or more of the CDMs 142 are receptive to user input triggering an evaluation of a document. For example, a graphical user interface for authoring documents includes an option, such as a button or menu entry (possibly denoted "Compliance Checker"), to evaluate a document. It is contemplated that, in certain embodiments, this operates similar to the spell-check feature commonly found in word processing programs, such as MICROSOFT WORD. As above, the evaluation seeks to determine whether the document complies with the classified document rules of the institution To evaluate a document, a CDM submits the document to the CDS 108 via the communications network 110, where the CDS 108 evaluates the document using the classified document rules and returns the results thereof. Results include whether a document complies with the classified document labeling policy of the institution and, optionally, a confidence level. Alternatively, to evaluate the document, the CDM locally evaluates the document through the use of the classified document rules of the institution. Suitably, the classified document rules are remotely located in the CDS 108, but it is contemplated that the classified document rules are local and/or stored in another component of the IT infrastructure 100. The process employed to perform the evaluation locally is described hereafter in conjunction with the CDS 108.

Regardless of the reason for evaluating a document, in certain instances, the CDMs 142 take corrective measures upon a determination that the document is non-compliant with the classified document labeling process of the institution. In certain embodiments, corrective measures are based on a confidence level of the evaluation. Corrective measures include one or more of modifying the document, deleting the document, moving the document, creating a link to the document, rejecting movement of the document, notifying a user, such as an owner of the document or an IT administrator, updating a document's retention policy, and the like. Further corrective measures are described hereafter in conjunction with the CDS 108.

In certain embodiments, the corrective measures are dependent upon the reason the document was evaluated. For example, if a document was evaluated because it was being printed and determined to be non-compliant with the classified document rules, the print job could be rejected or the document could be printed with a "classified document" symbol. As another example, if a document was evaluated because it was being emailed and determined to be non-compliant with the classified document rules, the email could be rejected or stripped of the document.

The classification engine 108 evaluates documents to facilitate compliance with the classified document labeling policy of the institution. The documents evaluated may be documents found by scanning the IT infrastructure 100 via, for example, the communications network 110. Additionally or alternatively, the documents evaluated may be received from components of the IT infrastructure 100, such as the user devices 106. An evaluation of a document suitably yields a determination as to whether the document is compliant with the classified labeling policy of the institution and, optionally, a confidence level thereof. In certain embodiments, subsequent to an evaluation of a document of the IT infrastructure 100, manual and/or automatic corrective measures are taken if the document is non-compliant. Additionally or alternatively, in certain embodiments, subsequent to or contemporaneous with a scan of the IT infrastructure 100, a report of compliance with the classified document labeling policy of the institution is generated and provided to one or more administrators of the institution. Additionally or alternatively, in certain embodiments, the CDS 108 is employed to correct documents in the IT infrastructure 100 when the CDS 108 is first deployed, and then the CDMs 142 are employed to maintain documents in the IT infrastructure 100.

Figure 2:
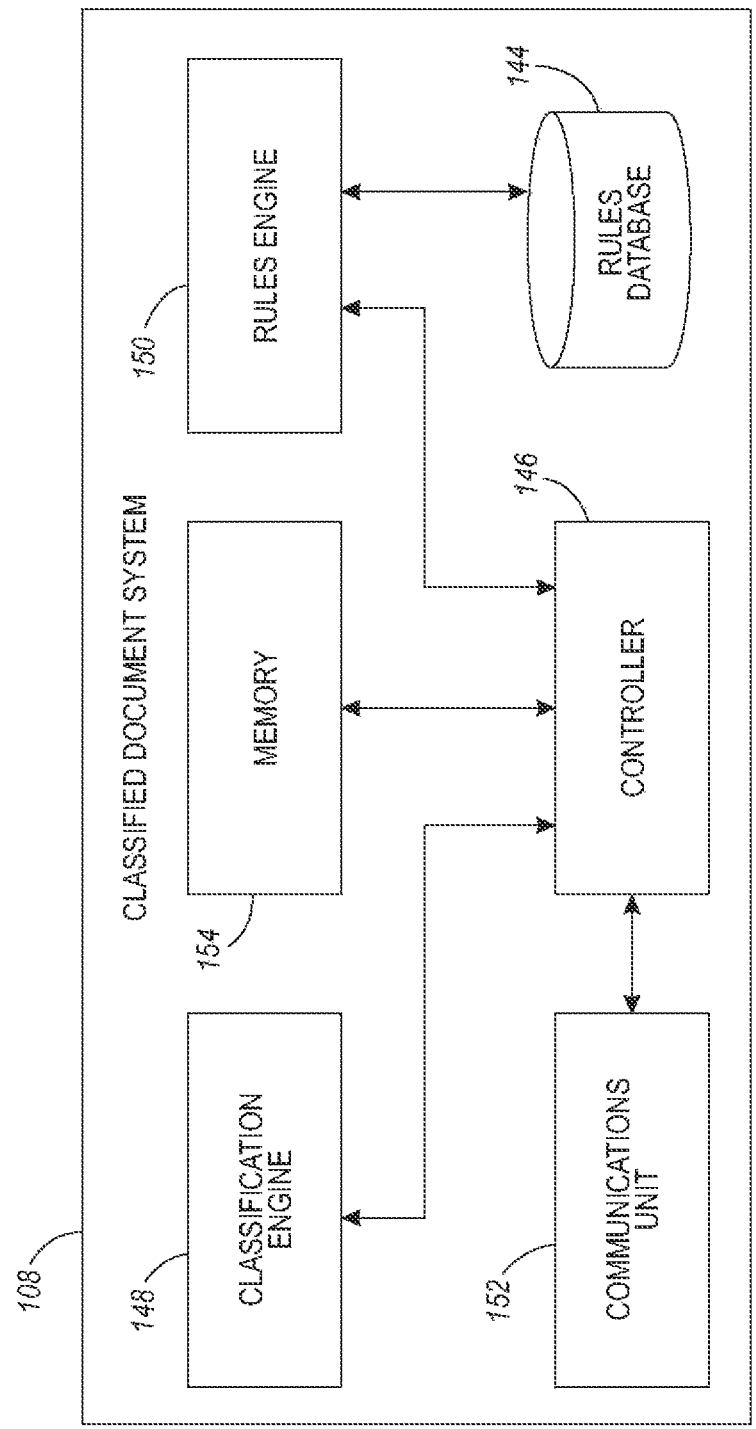
FIG. 2 is a detailed block diagram of a classified document system (CDS)

With reference to FIG. 2, a detailed view of the CDS 108 is provided. One or more servers and/or one or more databases typically embody the CDS 108. The servers and/or the databases are typically centrally located within the IT infrastructure 100 of the institution. However, it is contemplated that the servers and/or the databases are distributed throughout the IT infrastructure 100 at varying locations therein. As illustrated, the CDS 108 includes a rules database 144, a controller 146, a classification engine 148, a rules engine 150, a communications unit 152, and a memory 154.

The rules database 114 includes one or more rules embodying the classified document labeling policy of the institution in a computer interpretable form. In certain embodiments, the classified document labeling policy further encompasses retention policies for classified documents. The rules are suitably provisioned to determine a document's compliance with the classified document labeling policy given one or more parameters. These parameters include one or more of document type, creation date, modification date, document content, Meta data of the document, and the like.

The controller 146 scans the IT infrastructure 100 for documents to evaluate via the communications network 110. The scanning is suitably triggered at periodic intervals by, for example, a timer event. However, other trigger events are contemplated. For example, an IT administrator of the IT infrastructure 100 may initiate the scanning. As another example, scanning may be automatically initiated when the CDS 108 is first deployed to process existing documents in the IT infrastructure 100. In certain embodiments, the documents the controller 146 scans for include one or more of all documents, documents created and/or modified within a predetermined number of past days, documents that have not been evaluated before, and the like. The scanning includes scanning one or more of the DSS 102, the EMS 104, and the user devices 106. It is contemplated that, in certain embodiments, the controller 146 scans the user devices 106 by providing the CDMs 142 of the user devices 106 with network events instructing them to scan their associated user device for documents and, optionally, return found documents. As noted above, the CDMs 142 may employ trolling and/or viral technology.

Additionally or alternatively, the controller 146 listens on the communications network 110 for documents to evaluate. Documents received via the communications network 110 are typically received from the CDMs 142. However, it is contemplated that documents are received from other devices of the IT infrastructure 100. As noted above, the CDMs 142 may provided documents in response to requests therefor from the controller 146 or asynchronously by, for example, timer events of the CDMs 142.

Upon receiving or locating a document to evaluate, the controller 146 employs the classification engine 148 to determine a document type for the document. Document type is suitably the granularity with which the classified document labeling policy refers to documents. It is important to note the distinction between "classified documents" and "document classification". The latter refers to determining document type, such as an IRS 1040 form, a birth certificate, an auto loan application, and the like, whereas the former refers to determining if a document contains sensitive data, irrespective of document type. The classification engine 148, in addition to determining a document type, optionally determines a confidence level as to determined document type. In certain embodiments, the classification engine 148 uses XEROX SMART DOCUMENT TECHNOLOGIES (SDT) and/or commercial classification software, such as XIG CATEGORIX and KOFAX INDICIUS. Further, the classification engine 148 is suitably embodied by computer executable instructions, but hardware is contemplated.

Before the controller 146 or any other component of the CDS 108 use the classification engine 148, it is trained on a set of exemplar documents. The exemplars include one or more exemplar documents for each document type to be classified. Notably, however, the more exemplars in the training set, the more accurate the classification engine 148 will be. In certain embodiments, as documents types for documents passed to the classification engine 148 are confirmed by, for example, user input, these documents are added to the training set of exemplars. Document types may be confirmed in bulk by, for example, an IT administrator. Advantageously, expanding the training set allows refinement of the classification engine 148.

After identifying the document type, the controller 146 employs the rules engine 150 to determine whether the document is in compliance with the classified document labeling process of the institution. If the document has not been classified, this includes determining whether the document should be marked as classified. If the document is already classified, this includes determining whether the document is properly classified. For example, the author of the document may have marked the document as classified when it should not have been so marked. As another example, the author of the document may have been properly marked as classified when the document was created, but a sufficient amount of time has lapsed that the document need not be marked as classified any longer.

To make the abovenoted determinations, the rules engine 150 uses the rules in the rules database 144. These rules embody the classified document labeling process of the institution in a computer interpretable form. For example, it is contemplated that a rule in the rules database 144 specifies that a draft patent application is to be marked confidential for a year. Further, the rules are suitably dependent upon one or more parameters, such as document type, document creation date, a date within the document, Meta data associated with the document, and the like. As with the classification engine 148, the rules engine 150 optionally returns a confidence level as to the determination. In certain embodiments, the confidence level is dependent upon the confidence level of the classification engine 148. Further, the rules engine 150 is suitably embodied by computer executable instructions, but hardware is contemplated.

In certain embodiments, subsequent to or contemporaneous with a scan of the IT infrastructure 100, the controller 148 generates a report summarizing the results of the evaluations. This report is suitably provided to one or more administrators of the institution automatically, but it is contemplated that the report is provided to the administrators in response to a request therefor. The report advantageously allows the administrators to assess compliance with the classified document labeling policy of the institution. Additionally or alternatively, subsequent to an evaluation of a document, manual and/or automatic corrective measures are taken if the document is non-compliant.

Corrective measures include one or more notifying an IT administrative service of the non-compliant document and leaving it to IT administrative to correct; flagging the document as non-compliant in the file system; informing the owner of the suspected non-compliance; informing recipients of the document of the suspected non-compliance; automatically correcting the document; and the like. It is contemplated that, in certain embodiments, corrective measures are applied based on the confidence level attributed to a determination of non-compliance. For example, in certain embodiments, the automatic correction is performed if the confidence level of a document exceeds a certain threshold.

To notify the owner, the EMS 106, a CDM, or the like may be employed. Typically, the owner is determined based upon Meta data associated with the document. However, the owner may be determined based upon the location of the document within the IT infrastructure 100. For example, if the document is located on Joe's computer, the owner is determined to be Joe. In certain embodiments, the notice provided to the owner requests the owner to determine if the document is non-compliant. If the owner finds the document is compliant, the IT administrative service is suitably notified thereof. If the owner finds the document to be non-compliant, the controller 148 suitably corrects it automatically or leaves it to the owner to correct.

In certain embodiments, the recipients of the document are provided notice similar to the notice provided to the owner of the document. The recipients of the document are suitably determined through review of the audit log of the EMS 104. Additionally or alternatively, the recipients are determined through review of the audit log of the DSS 102. A recipient in the context of the DSS 102 is one that copied the document from the DSS 102 over the communication network 110.

When automatically correcting the document, if the document was incorrectly marked as classified, the document is de-classified. If the document was not marked as classified, the controller 148 annotates the document and/or updates the classified status of the document. Further, in certain embodiments, the controller 148 sets the retention policy of the document based on parameters of the document, such as one or more of the time stamp for creation, a date included in the document, and the like. If the document is outside the retention period, the controller 148 may refrain from updating the retention policy of the document.

In certain embodiments, the controller 148 looks for copies of the document within the IT infrastructure 100 as part of automatic correction. This may be performed by doing a general search of the IT infrastructure 100, as discussed above. Additionally or alternatively, this may be performed by checking the audit logs associated with the DSS 102 and/or the EMS 104 to determine if the document was electronically messaged to another and/or copied. Insofar as the document was electronically messaged, a search of a user device of the recipient is optionally performed. In certain embodiments, this is performed via a CDM. When a copy is found, the controller 148 suitably performs one of deleting it, replacing it with the corrected version, moving the corrected version to the DSS 104 and replacing the copy with a link to the corrected version on the DSS 104, and the like.

The communications unit 152 allows the CDS 108 to interact with other components of the IT infrastructure 100, such as the DSS 102 and the user devices 106, via the communications network 110. The memory 154 includes computer executable instructions for performing the abovenoted functions associated with controller 154, such as scanning the IT infrastructure 100 for documents. The controller 148 suitably carries out the computer executable instructions of one or more of the memory 154, the classification engine 148, and the rules engine 150.

Figure 3:
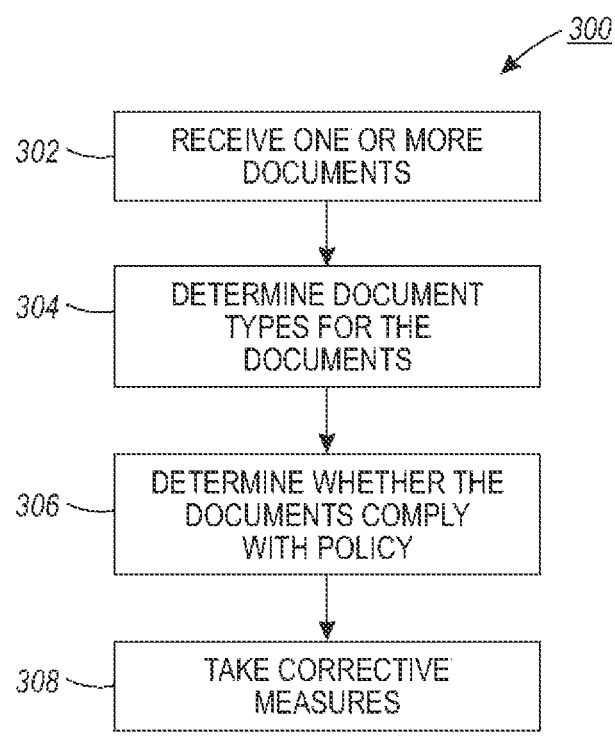
FIG. 3 is a flow chart of a method of evaluating documents to determine whether they should be labeled as classified.

With reference to FIG. 3, a method 300 of maintaining a classified document policy of the institution is provided. It is contemplated that the method 300 is performed by the CDM 142 or the CDS 108. According to the method 300, one or more documents are received 302 and document types are determined 304 therefor. A determination 306 is made as to whether the documents comply with the classified document labeling policy of the institution using one or more rules. The rules embody the classified document labeling policy of the institution in a computer interpretable form and are dependent upon document type. Corrective measures for ones of the documents determined to be non-compliant are taken 308.

As used herein, a memory includes one or more of a non-transient computer readable medium; a magnetic disk or other magnetic storage medium; an optical disk or other optical storage medium; a random access memory (RAM), read-only memory (ROM), or other electronic memory device or chip or set of operatively interconnected chips; an Internet server from which the stored instructions may be retrieved via the Internet or a local area network; or so forth. Further, as used herein, a controller and/or a processor include one or more of a microprocessor, a microcontroller, a graphic processing unit (GPU), an application-specific integrated circuit (ASIC), a field-programmable gate array (FPGA), and the like; a communications network includes one or more of the Internet, a local area network, a wide area network, a wireless network, a wired network, a cellular network, a data bus, such as USB and I2C, and the like; a user input device includes one or more of a mouse, a keyboard, a touch screen display, one or more buttons, one or more switches, one or more toggles, and the like; and a display includes one or more of a LCD display, an LED display, a plasma display, a projection display, a touch screen display, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of maintaining a classified document labeling policy of an institution, said method comprising:
   receiving one or more documents;
   determining document types for the documents;
   determining whether the documents comply with the classified document labeling policy of the institution using one or more rules embodying the classified document labeling policy of the institution in a computer interpretable form, wherein the rules are dependent upon document type and are used to determine if a document contains sensitive data; and,
   taking corrective measures for ones of the documents determined to be non-compliant, wherein the corrective measures for each document determined to be non-compliant are applied based on a confidence level in the determination of non-compliance for the document and wherein the corrective measures include one or more of:
   denying the sharing of one or more of the ones of the documents determined to be non-compliant;
   stripping electronic messages including the one or more of the ones of the documents determined to be non-compliant before they are sent; and,
   adding a classified document symbol to print jobs of the one or more ones of the documents determined to be non-compliant;
   wherein the method is performed by at least one processor.

2. The method according to claim 1, further comprising:
   scanning an information technology (IT) infrastructure of the institution for documents to identify the received documents.

3. The method according to claim 2, wherein the scanning scans user devices of the IT infrastructure using viral and/or trolling technology.

4. The method according to claim 1, wherein the received documents includes one or more document images.

5. The method according to claim 1, further comprising:
   monitoring a user devices in real time for authoring and/or sharing of documents, wherein the received documents include documents being authored and/or shared.

6. The method according to claim 5, wherein sharing includes electronically messaging one or more documents and/or printing one or more documents.

7. The method according to claim 1, wherein the corrective measures include:
   scanning an information technology (IT) infrastructure of the institution for copies of the ones of the documents determined to be non-compliant.

8. The method of according to claim 7, wherein the scanning is focused based on one or more audit logs, wherein the audit logs track actions pertaining to the ones of the documents determined to be non-compliant.

9. The method according to claim 7, wherein the corrective measures include:
   automatically correcting the ones of the documents determined to be non-compliant; and,
   one or more of:
   deleting the copies;
   replacing the copies with pointers to the corrected ones of the documents determined to be non-compliant;
   replacing the copies with the corrected ones of the documents determined to be non-compliant; and,
   automatically correcting the copies.

10. The method according to claim 1, wherein the corrective measures include:
    updating the retention policies of the ones of the documents determined to be non-compliant.

11. The method according to claim 1, wherein document type is the granularity with which the classified document labeling policy refers to documents.

12. The method according to claim 1, wherein classified documents are documents including confidential and/or business sensitive data.

13. A classified document system for maintaining a classified document labeling policy of an institution, said system comprising:
    a classification engine that determines document types for one or more documents;
    a rules engine that determines whether the documents comply with the classified document labeling policy of the institution using one or more rules, wherein the rules embody the classified document labeling policy of the institution in a computer interpretable form and are dependent upon document type; and, a controller that receives the documents and takes corrective measures for ones of the documents determined to be non-compliant;

wherein the corrective measures include:
  scanning an information technology (IT) infrastructure of the institution for copies of the ones of the documents determined to be non-compliant;
  denying the sharing of one or more of the ones of the documents determined to be non-compliant;
  stripping electronic messages including the one or more of the ones of the documents determined to be non-compliant before they are sent; and
  adding a classified document symbol to print jobs of the one or more ones of the documents determined to be non-compliant.

14. The classified document system according to claim 13, wherein the controller scans an information technology (IT) infrastructure of the institution to identify the received documents.

15. The classified document system according to claim 13, further comprising:
  one or more memories including computer executable instructions embodying the classification engine and the rules engine, wherein the controller executes the computer executable instructions.

16. The system of claim 13, wherein the corrective measures for each document determined to be non-compliant are applied based on a confidence level in the determination of non-compliance for the document.

17. A user device including a classified document module for maintaining a classified document labeling policy of an institution, said user device including:
  a non-transitory computer readable medium that causes at least one computer to:
    monitor the user device in real time for authoring and/or sharing of documents;
    determine document types for one or more documents being authored and/or shared;
    determine whether the documents comply with the classified document labeling policy of the institution using one or more rules, wherein the rules embody the classified document labeling policy of the institution in a computer interpretable form and are dependent upon document type; and,
    take corrective measures for ones of the documents determined to be non-compliant;
  wherein the corrective measures include one or more of:
    denying the sharing of one or more of the ones of the documents determined to be non-compliant;
    stripping electronic messages including the one or more of the ones of the documents determined to be non-compliant before they are sent; and,
    adding a classified document symbol to print jobs of the one or more ones of the documents determined to be non-compliant.

18. The user device according to claim 17, wherein sharing includes electronically messaging one or more documents and/or printing one or more documents.

19. The user device according to claim 17, wherein the classified document module uses viral and/or trolling technology.

* * * * *